United States Patent [19]
Tanaka et al.

[11] Patent Number: 5,459,393
[45] Date of Patent: Oct. 17, 1995

[54] BEAM POSITION MONITOR AND BEAM POSITION DETECTING METHOD

[75] Inventors: Hirofumi Tanaka; Tetsuya Nakanishi, both of Amagasaki, Japan

[73] Assignee: Mitsubishi Denki Kabushiki Kaisha, Tokyo, Japan

[21] Appl. No.: 955,448

[22] Filed: Oct. 2, 1992

[30] Foreign Application Priority Data

| Oct. 4, 1991 | [JP] | Japan | 3-258063 |
| Mar. 10, 1992 | [JP] | Japan | 4-051317 |
| Aug. 31, 1992 | [JP] | Japan | 4-231771 |

[51] Int. Cl.⁶ ............................ G01N 27/00; H01J 29/00
[52] U.S. Cl. ........................ 324/71.3; 315/500; 327/600
[58] Field of Search ............................ 324/71.3, 661, 324/662; 328/233, 234, 235, 254, 256; 315/500, 501, 502, 503, 506, 507; 327/599, 600

[56] References Cited

U.S. PATENT DOCUMENTS

| 2,438,709 | 3/1948 | Labin et al. | 328/254 |
| 2,790,902 | 4/1957 | Wright | 328/256 |
| 3,612,858 | 10/1971 | DeParry | 324/71.3 X |
| 4,058,730 | 11/1977 | Meyer et al. | 250/397 |
| 4,835,446 | 5/1989 | Nation et al. | 328/256 X |
| 5,001,416 | 3/1991 | Bittner et al. | 324/71.3 |

FOREIGN PATENT DOCUMENTS

| 0101867 | 3/1984 | European Pat. Off. . | |
| 0239646 | 10/1987 | European Pat. Off. . | |
| 0351956 | 1/1990 | European Pat. Off. . | |
| 0402124 | 12/1990 | European Pat. Off. . | |
| 4020840 | 9/1965 | Japan | 324/71.3 |
| 0284500 | 11/1988 | Japan | 324/71.3 |

OTHER PUBLICATIONS

*Patent Abstracts of Japan,* vol. 15, No. 5, Section P, p. 105, JP-2-254370.

H. Koziol, "Beam Diagnostics", a paper presented at the CERN Accelerator School, 3rd gen. Accelerator Physics Course, Sep. 19–30, 1989, Salamanaca, Spain (CERN 89–05, vol. 20, Apr. 1989, pp. 63–97).

*Primary Examiner*—Kenneth A. Wieder
*Assistant Examiner*—Glenn W. Brown
*Attorney, Agent, or Firm*—Burns, Doane, Swecker & Mathis

[57] ABSTRACT

A beam position monitor capable of detecting the exact position of a beam of charged particles even if the beam has a large cross sectional area with its beam center being deviated from the center of the monitor. A plurality of electrodes 4A through 4D are disposed in a vacuum chamber 3 for inducing voltages when a beam passes through the vacuum chamber. A first voltage ratio is determined based on the voltages at the respective electrodes induced by the beam to thereby detect the beam position. An antenna 10 is disposed in the vacuum chamber 3 at a beam path for inducing voltages at the respective electrodes. A second voltage ratio is determined based on the voltages at the respective electrodes induced by the antenna whereby the first voltage ratio is corrected by using the thus determined second voltage ratio. The antenna has a cross sectional area equal to or less than that of the beam.

6 Claims, 12 Drawing Sheets

BEAM POSITION MONITOR AND BEAM POSITION DETECTING METHOD

BACKGROUND OF THE INVENTION

The present invention relates to a beam position monitor used with a circular charged particle accelerator and a method for measuring the position of a beam of charged particles in such an accelerator.

Figure 13:
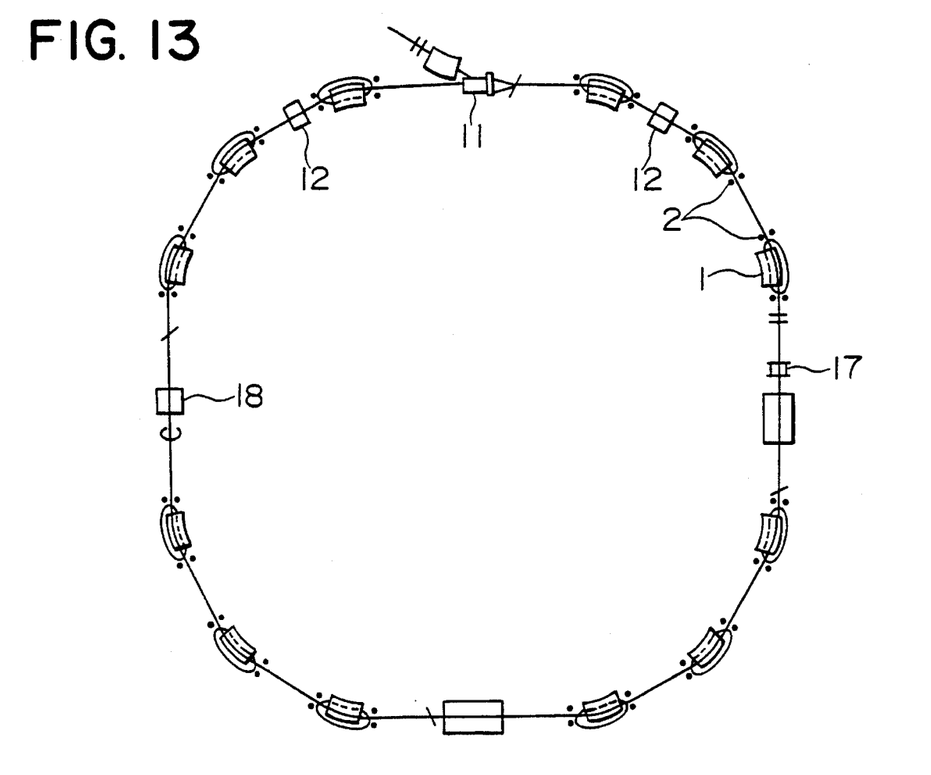
FIG. 13 is a schematic plan view of a general type of circular charged particle accelerator.

FIG. 13 shows a typical example of a known circular charged particle accelerator in the form of a synchrotron. In general, a beam of charged particles injected into the synchrotron is curved by a bending electromagnet 1 to circulate in a hollow ring or annular duct. The continuous beam circulating in the ribs is bunched and accelerated by high-frequency electromagnetic fields, i.e., charged particles in the beam are congregated or clustered and accelerated. The whole charged particles of the bunched beam circulate along a single beam orbit while oscillating therearound. A maximum magnitude of such oscillations is called a beam size.

Although the beam orbit is designed to pass through the center of a tubular vacuum chamber in the circular ring, the actual beam orbit can be deviated from the center of the vacuum chamber due to, for example, variations in the installation position of the bending electromagnet 1 and the like. Since the beam should be present in the vacuum chamber, such a deviation of the beam orbit reduces an area or space in which the beam can perform an orbital movement, thus resulting in an accordingly decreased beam current which can be introduced and accelerated. To avoid this, a multitude of beam position monitors 2 are disposed around the ring for detecting or measuring the position of the beam in the vacuum chamber therein and generating a corresponding signal, based on which unillustrated correction electromagnets disposed around the ring operate to properly correct or modify the position of the beam orbit.

Figure 14:
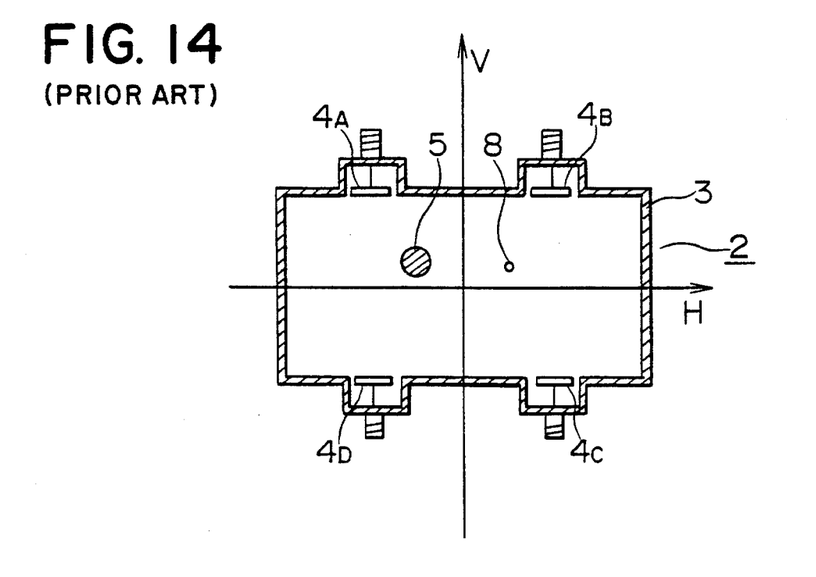
FIG. 14 a cross section of a conventional beam position monitor.

FIG. 14 shows in cross section an example of a conventional beam position monitor 2 as published at the Sixth Symposium on Accelerator Science and Technology concerning the accelerator science and technology held in Tokyo in the year of 1987. In this Figure, the monitor 2 includes a hollow vacuum chamber 3 through which a beam 5 of charged particles passes, and a plurality of (i.e., four in the illustrated example) button electrodes 4A through 4D disposed in the vacuum chamber 3.

Now, the operational principle of the beam position monitor 2 of FIG. 14 will be described in brief. Each time the beam 5 of charged particles passes through an illustrated specific position in the vacuum chamber 3, charges are induced in the respective electrodes 4A to 4D. At this time, the largest amount of charge is induced in the electrode 4A which is the nearest to the beam 5, whereas the least amount of charge is induced in the electrode 4C which is the remotest from the beam 5. When the beam 5 passes through the center of the vacuum chamber 3, the amounts of charge induced in the respective electrodes 4A to 4D become equal to each other. Though not illustrated, the electrodes 4A to 4D are connected to ground through resistors, respectively, so that a voltage across each resistor is measured to sense the position of the beam. In this regard, it is to be noted that the magnitude of the voltage thus induced is proportional to the amount of charge of the beam differentiated by time, so a continuous beam results in zero voltage induced. Therefore, the beam must be bunched.

Figure 15:
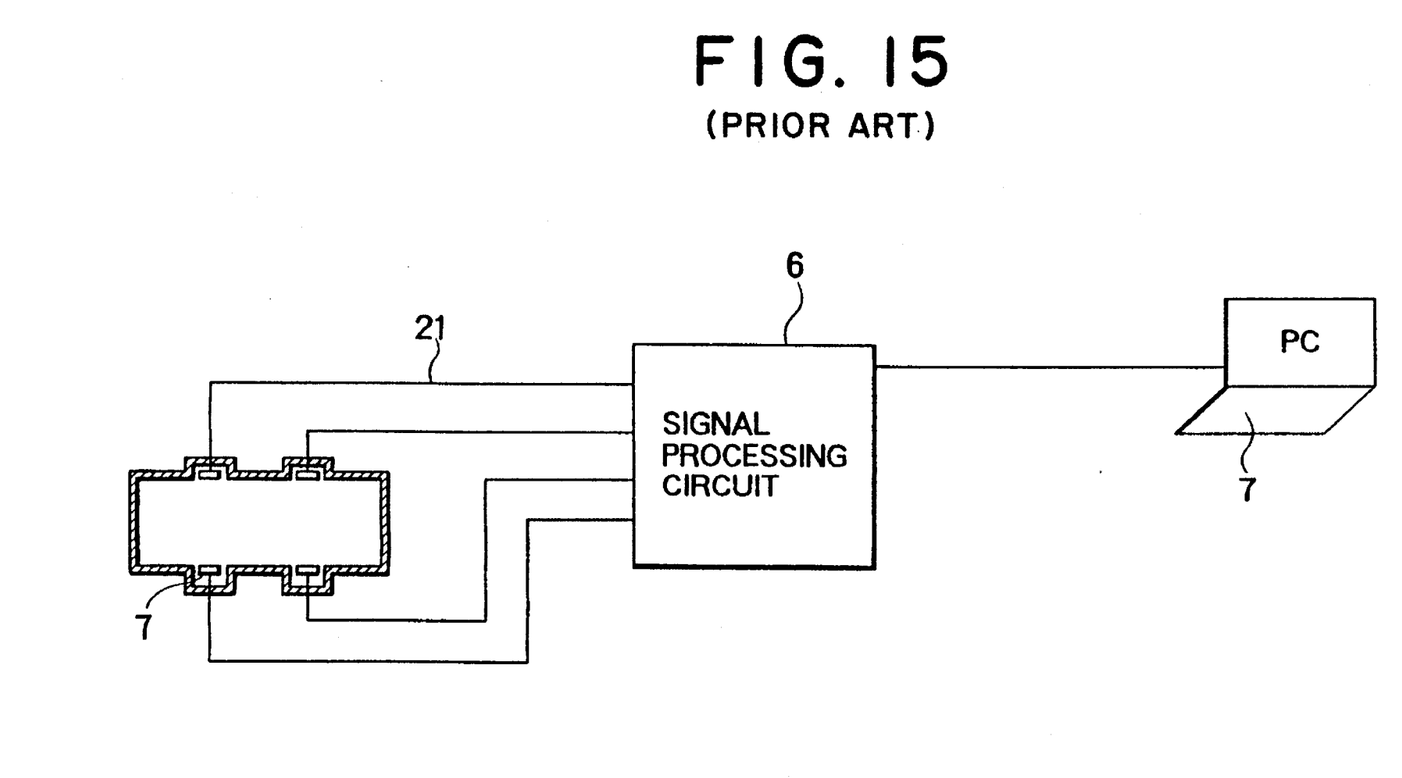
FIG. 15 is a schematic view showing a signal processing system for the beam position monitor of FIG. 14.

Accordingly, the beam position monitor generates an output signal in the form of a series of pulses, which, if expanded so a Fourier series, becomes equal to a multiple of the frequency of the orbital movement of the beam. As shown in FIG. 15, a signal processing circuit 6 processes an output signal of the beam position monitor in the following manner in order to perform a signal amplification at a high S/N ratio. Namely, it selects a certain high-frequency component among the monitor output signal, amplifies is in a heterodyne manner, and then converts in from analog into digital form which is finally read out by a computer 7.

A conventional process of correcting the beam position by use of the beam position monitor 2 of FIG. 14 will be described below while referring to FIG. 16. In this Figure, the beam position monitor 2 is similar to that of FIG. 14 although the shape of the vacuum chamber 3 is somewhat different from that of FIG. 14.

Figure 16:
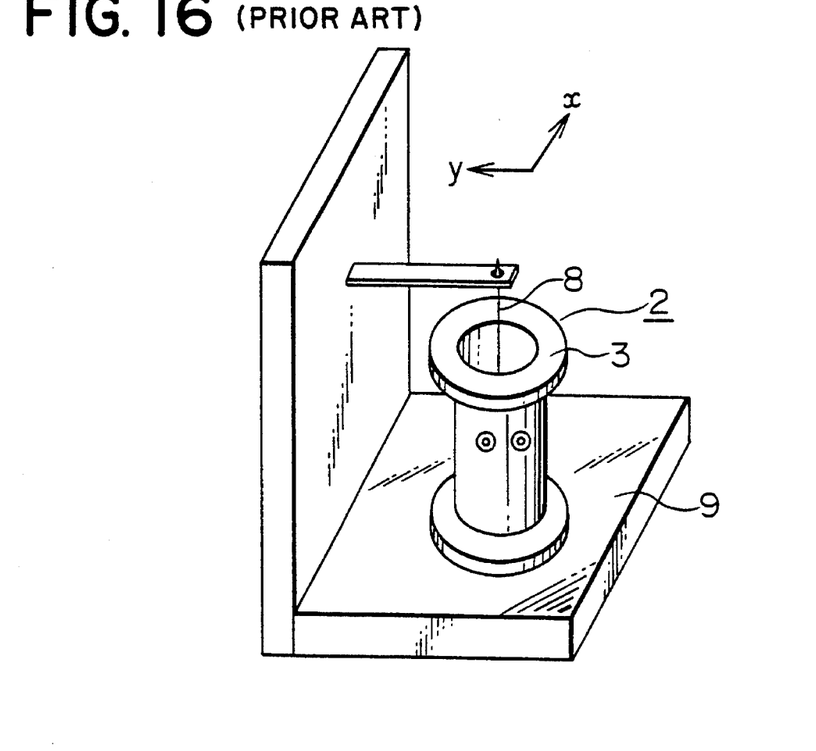
FIG. 16 is a perspective view showing a conventional beam position correcting method employed with the monitor of FIG. 14.
Figure 17:
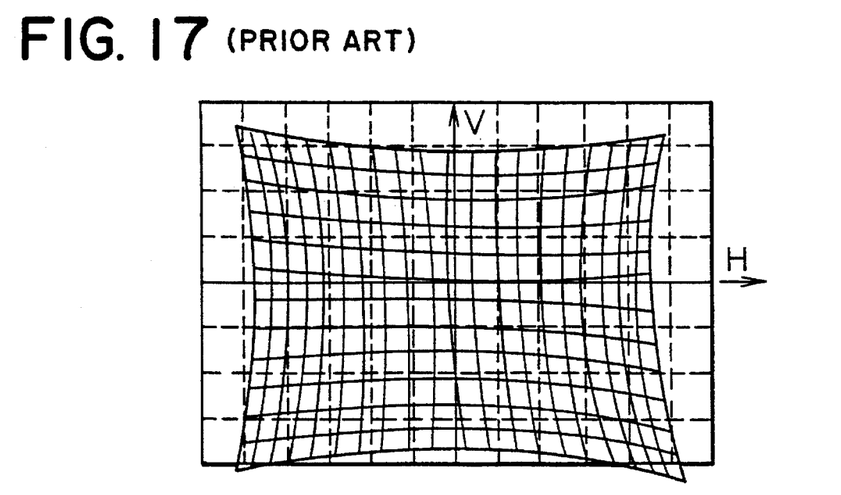
FIG. 17 shows the result of correction performed by the conventional method.

First, as shown in FIG. 16, a drive table 9 is moved in an x-axis or y-axis directions so as to accordingly displace the beam position monitor 2 mounted thereon while an antenna 8 in the form of a fine wire inserted in the cylindrical hollow interior of the vacuum chamber 3 generates high-frequency pulses. During the movement of the beam position monitor 2, voltages across the respective electrodes 4A to 4D are measured to calculate the following two voltage ratios:

$$H=(A+D-C-B)/(A+B+C+D)$$

$$V=(A+B-C-D)/(A+B+C+D)$$

where A is a voltage across the electrode 4A; B is a voltage across the electrode 4B; C is a voltage across the electrode 4C; and D is a voltage across the electrode 4d. FIG. 17 shows these voltage ratios H, V when the antenna 8 is being moved relative to the beam position monitor 2 in the x-axis or y-axis direction. The ratios M, V are plotted on the H-V plane when the antenna 8 is moving in the y-axis direction with the value of x being held constant (e.g., x=0, ±1 mm, ±2 mm, . . . ), or in the x-axis direction with the value of y being held constant (e.g., y=0, ±1, ±2, . . . ).

Thus, by plotting the voltage ratios H, V output from the beam position monitor 2 on the H-V plane as shown in FIG. 17 while changing the number of horizontal or vertical solid lines per unit length, the position of the antenna 8 can be detected and then corrected to a proper location based thereon. For this reason, these solid lines are called "correction curves". In case of the beam position monitor 2, the position of the beam can be recognized based on the voltage ratios H, V output from the monitor 2 and the correction lines plotted on the H-V plane. The apparent asymmetry of the correction lines with respect to the center of the H-V plane is due to variations in the mounting of the electrodes 4A to 4D.

According to the conventional correction method of the beam position monitor 2 as described above, accurate position measurements can be performed in cases where the size or diameter of the beam is as small as that of the antenna 8, but it becomes impossible even if the beam center is concentric with the antenna 8, as long as the beam diameter or size is larger than the antenna diameter with the beam center being deviated from center of the beam-position monitor 2. In a synchrotron for electromagnetically accelerating a low energy beam injected therein, it is very difficult to accurately detect the position of the beam since the beam diameter at the time of injection thereof is very large.

SUMMARY OF THE INVENTION

Accordingly, the present invention is intended to overcome the above-described problems encountered with the conventional beam position monitor.

It is an object of the invention to provide a beam position monitor and a beam position detecting method which can precisely detect the position of a beam even if the beam diameter is large.

In order to achieve the above object, according to one aspect of the invention, there is provided a beam position monitor comprising: a vacuum chamber through which a beam of changed particles passes: a plurality of electrodes disposed in the vacuum chamber for inducing voltages when the beam passes through the vacuum chamber; means for determining a first voltage ratio based on the voltages at the respective electrodes induced by the beam to thereby detect the position of the beam; an antenna disposed in the vacuum chamber at a location through which the beam passes, for inducing voltages at the respective electrodes; and means for determining a second voltage ratio based on the voltages at the respective electrodes induced by the antenna and for correcting the first voltage ratio using the thus determined second voltage ratio; wherein the antenna has a cross sectional area equal to that of the beam.

According to another aspect of the invention, there is provided a beam position monitor comprising: a vacuum chamber through which a beam of charged particles passes; a plurality of electrodes disposed in the vacuum chamber for inducing voltages when the beam passes through the vacuum chamber; means for determining a first voltage ratio based on the voltages at the respective electrodes induced by the beam to thereby detect the position of the beam: an antenna disposed in the vacuum chamber at a location through which the beam passes, for inducing voltages at the respective electrodes; and means for determining a second voltage ratio based on the voltages at the respective electrodes induced by the antenna and for correcting the first voltage ratio using the thus determined second voltage ratio: wherein the antenna has a cross sectional area substantially less than that of the beam, and the second voltage ratio is given by correcting the first voltage ratio through calculations.

According to a further aspect of the invention, there is provided a beam position detecting method comprising the steps of: accelerating a beam in an accelerating ring to a predetermined higher energy level through application of electromagnetic fields; decelerating the thus accelerated beam to an initial energy level at which the beam is injected into the accelerating ring; and measuring the position of the beam which is thus decelerated to the initial energy level.

According to yet further aspect of the invention, there is provided a beam position monitor comprising: a beam scraper disposed in a beam orbit for scraping a beam circulating in an accelerating ring into a predetermined beam size; and means for measuring the position of the scraped beam having the predetermined beam size.

According to a still further aspect of the invention, there is provided a beam position detecting method comprising the steps of: generating an electromagnetic injection pulse for changing a portion of a beam orbit in an accelerating ring near a beam injection point; injecting a beam of charged particles into the accelerating ring in such a manner that the time of termination of the beam injection substantially coincides with the time at which the electromagnetic injection pulse reaches a peak; and detecting the position of the beam having a small cross sectional area.

According to a further aspect of the invention, there is provided a beam position detecting method comprising the seeps of: generating an electromagnetic injection pulse for changing a portion of a beam orbit in an accelerating ring near a beam injection point; injecting a beam of charged particles into the accelerating ring at the time when the electromagnetic injection pulse reaches a peak, the beam having a beam length substantially equal to the circumferential length of the accelerating ring; and detecting the position of the beam having a small cross sectional area.

The above and other objects, features and advantages of the invention will be more readily apparent from the following detailed description of preferred embodiments of the invention taken in conjunction with the accompanying drawings.

DESCRIPTION OF THE PREFERRED EMBODIMENTS

Preferred embodiments of the present invention will be described below in detail with reference to the accompanying drawings.

EMBODIMENT 1

Figure 1:
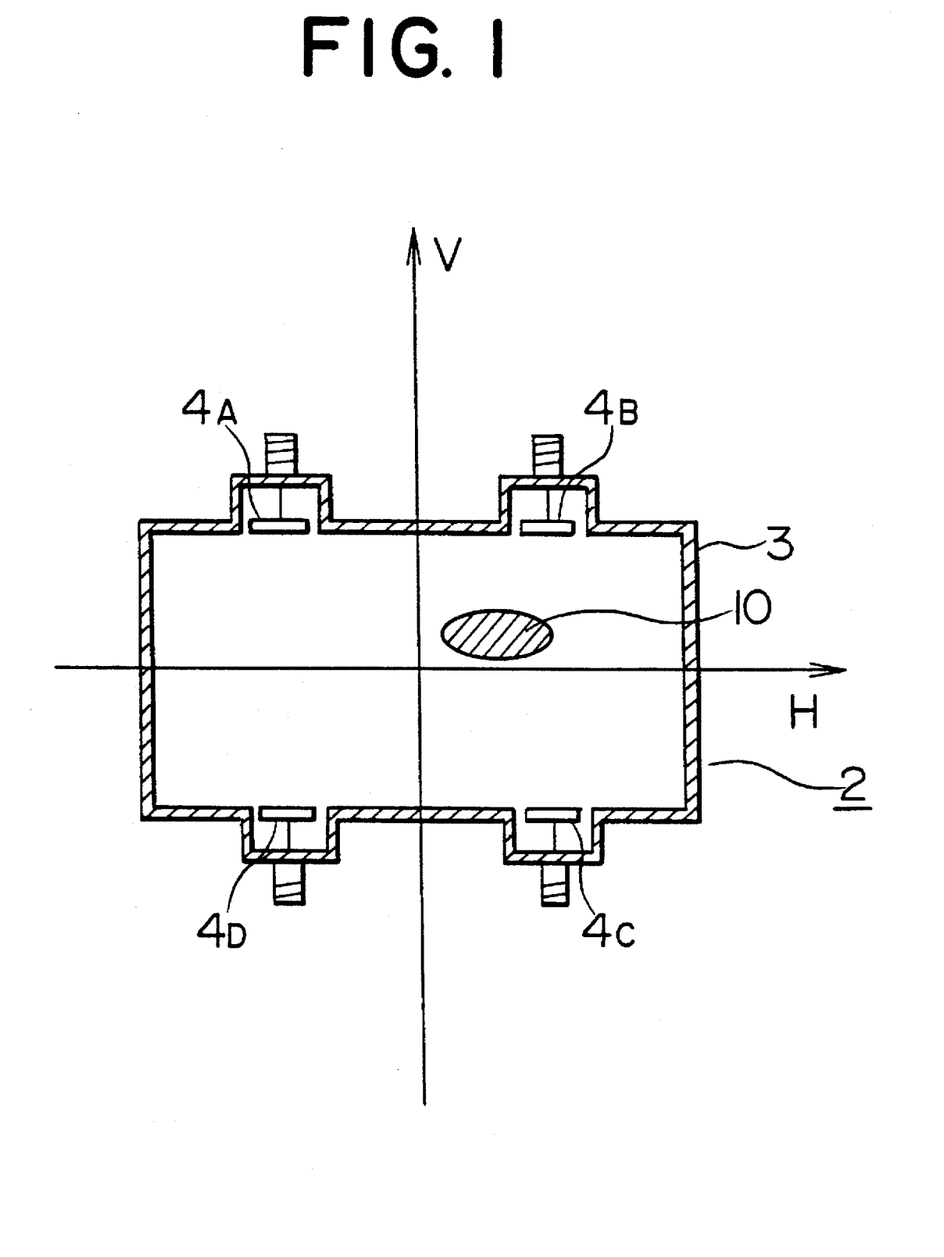
FIG. 1 is a cross section of a beam position monitor according to a first embodiment of the invention.

FIG. 1 illustrates, in cross section, a beam position monitor according to a first embodiment of the invention. In this Figure, elements which are the same as or correspond to those of FIG. 14 are identified by the same symbols, thus omitting a detailed description thereof. In FIG. 1, reference numeral 10 designates an antenna having a cross sectional area similar to the size of a beam of charged particles. The method of correcting the beam position according to the invention is substantially the same as the aforementioned conventional method only except for the fact that the size of the antenna 10 is different from the conventional one of FIG. 14. By use of the large-sized antenna 10, it is possible to accurately measure or detect the position of the beam even if the beam size or diameter is large with the center of the beam being deviated from the center of the monitor 2. Although the illustrated antenna 10 has an elliptical cross sectional configuration, it can cake other cross sectional shapes such as a circular shape and the like.

EMBODIMENT 2

Although in the embodiment 1 above, the antenna 10 having a large cross section is employed in order to form correction curves for a beam of a large size or cross section, such correction curves can be obtained through mathematical calculations. In this case, however, variations in the mounting positions of the electrodes 4A to 4D, which result in asymmetry of the measured correction curves, can not be found through calculations. To cope with this, correction curves for a large-sized beam are first calculated and then modified or corrected by use of a conventional fine antenna 8 (see FIG. 14) having a small diameter (i.e., less than the beam size) to provide accurate correction curves.

Figure 2:
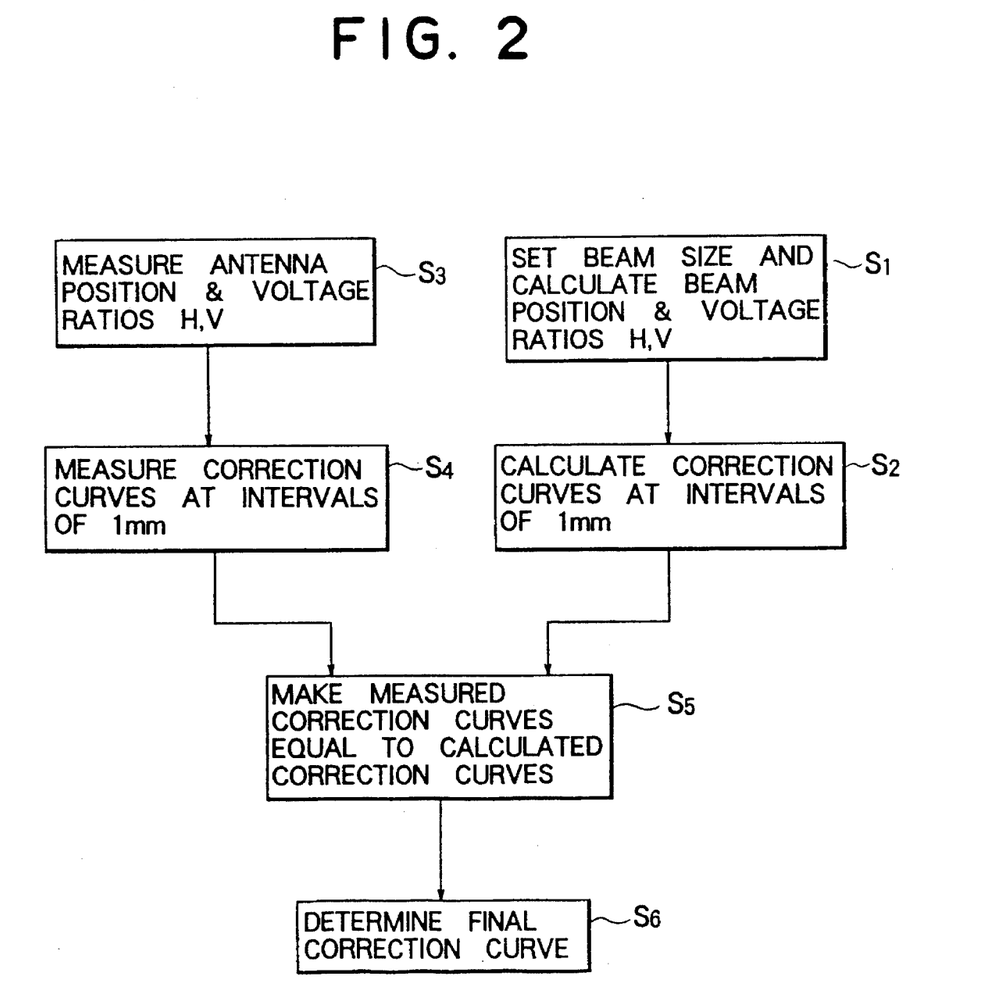
FIG. 2 is a flow chart showing the operation of a second embodiment of the invention.

FIG. 2 shows the operation of this embodiment. First, in Step S1, the size of a beam is set to an arbitrary value, and voltage ratios H, V with respect to the beam position (x, y) are determined through calculations, i.e., using a well-known two-dimensional electromagnetic field analysis method such as a commercial program called "Poisson" produced by Ronulard Holsinger, sold by Los alamos National Laboratory. Then in Step S2, correction curves are calculated by successively moving the position of the beam step by step (e.g., by 1 mm at a time) in the x-axis or y-axis direction. Subsequently, in Step S3, the relationship between the voltage ratios H. V and the beam position (x, y) is measured using the fine antenna 8 as in the conventional apparatus of FIG. 14, and then in Step S4, correction curves as shown in FIG. 13 are measured while successively moving the beam position (x, y) in the x-axis or y-axis direction by 1 mm in a stepwise manner. In this case, the calculated correction curves obtained in Step S2 include influences due to the beam size, and the measured correction curves include influences due to variations in the mounting of the electrodes 4A to 4D. Accordingly, in Step S5, the intervals between the measured correction curves are made equal to those of the calculated correction curves, so that final correction curves are thereby provided in Step S8. Although in this case, the beam position (x, y) is stepwisely moved by 1 mm, the amount of each stepwise movement can be of other values.

EMBODIMENT 3

Figure 3:
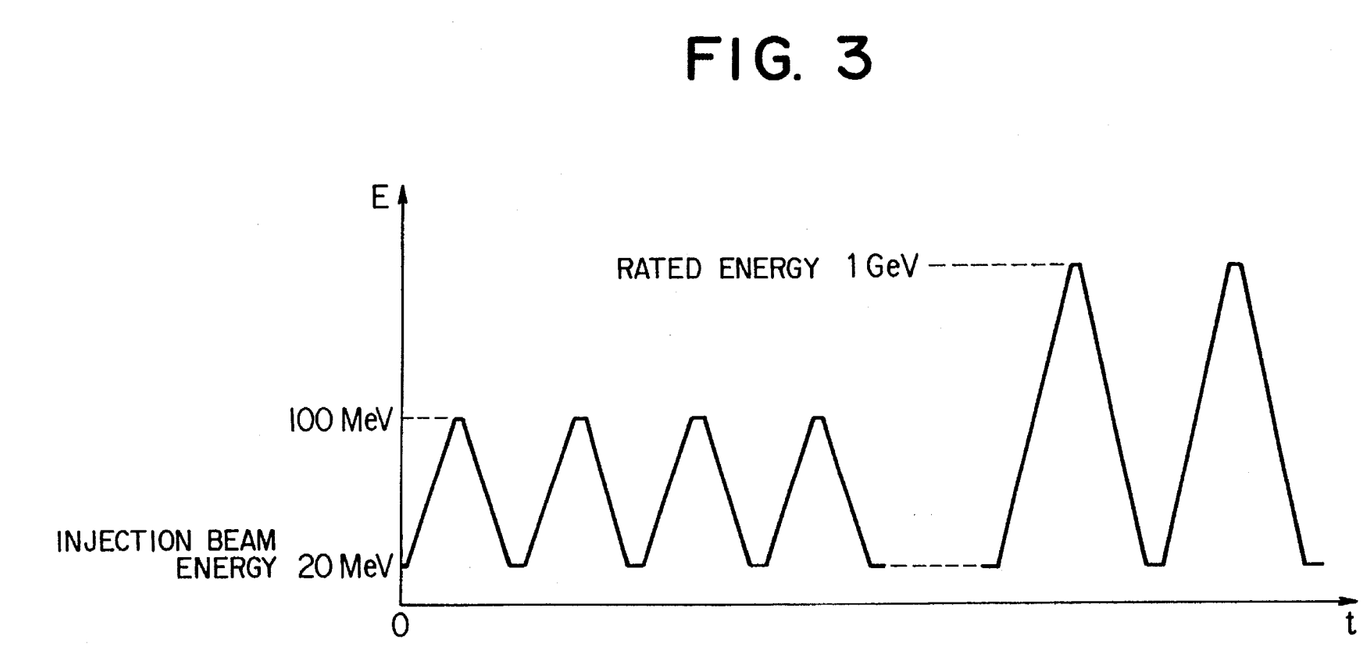
FIG. 3 is an explanatory view showing general operating patterns of a circular charged particle accelerator.

FIG. 3 shows an operating pattern of a circular charged particle accelerator such as a synchrotron as shown in FIG. 13. In FIG. 3, the abscissa designates time t and the ordinates designates beam energy E. In order to accelerate a beam of charged particles with the least energy loss, it is necessary to increase the magnetic field strengths of each bending magnet 1 (see FIG. 13) and each unillustrated quadrupole magnet disposed around the beam accelerating ring or duct in accordance with the increasing energy E of the beam while holding the field strength ratio of the bending magnet to the quadrupole magnet at a constant value.

The operating pattern of the ordinary circular charged particle accelerator of FIG. 13 is such that a beam accelerating/decelerating pattern as shown in FIG. 3 is repeated in a continuous manner. In order to take out a beam from the beam accelerating ring after the beam has been accelerated to a predetermined energy level, it is not desirable to decrease the power supply to all the magnets equally in their relative ratios particularly in a range in which the magnetic field strength is falling. If, however, the magnetic fields of all the magnets are reduced equally relative to each other in such a magnetic field range, the beam can be decreased to the injection energy level (e.g., 20 MeV) of the beam without an energy loss if not taken out from the accelerating ring.

In the case of an electron accelerating apparatus, when the beam energy is less than about 200 MeV, the higher the beam energy, the lesser becomes the beam size due to an irradiation loss of energy. For instance, if it takes 0.5 seconds to accelerate the beam from an injection energy level (e.g., 20 MeV) to a predetermined higher energy level (e.g., 100 MeV) and then decelerate it, the beam size becomes sufficiently small even after the beam is decelerated to the injection energy level. Accordingly, good results will be obtained if the position of the beam is detected at the time when the beam is first accelerated and then decelerated.

In an ordinary synchrotron, a good measurement or detection will be provided if the position of a beam is detected when the beam energy is raised from its injection energy level to reduce the beam size. Since the position or orbit of a beam generally varies depending upon the energy level thereof, and since beam position information is required in a low energy range in which the energy of an injection beam lies, the above method is effective. The reasons why the beam position information is required in the low energy range are as follows. Namely, in the low energy range, the beam size is large and hence a greater area or space is necessary for orbital movement of the beam, and a deviation of the beam position or orbit becomes the greatest at a low beam energy level due to influences of residual magnetic fields of electromagnets disposed around the beam accelerating ring or duct.

For example, even if a beam of 100 mA (milliamperes) exists in a horizontal range of 100 mm at the time of beam injection, the beam size is decreasing in accordance with the increasing speed of the beam. Thus, the horizontal beam size is reduced to 10 mm when the beam of 100 mA has been accelerated to an energy level of 100 MeV. That is, the required horizontal length of the vacuum chamber with the beam energy of 100 MeV can be 10 though that required at the time of beam injection is 100 Accordingly, with the vacuum chamber size of 100 mm, no problem will arise even if there is a deviation of several tens of millimeters in the beam position in the energy range of 100 MeV, but at the time of beam injection, such a deviation results in a reduction in the beam current. Therefore, after detection of a deviation of the beam position in this manner, the beam orbit is corrected or modified by means of a correction electromagnet so as to provide a predetermined beam position, thereby increasing the injection beam energy.

Here, it is to be noted that the larger the beam current, the greater the output level of the beam position monitor 2 becomes, thus enabling accordingly improved beam position detection. According to the above-described method in which a new beam is injected after the size of the already existing beam circulating in the accelerating ring has been sufficiently reduced through deceleration, the injection of the new beam does not cause any significant loss in the already accumulated energy of the existing beam circulating in the accelerating ring, so the magnitude of the total beam current is gradually increased with repeated injections of beams. However, a limited amount of beam energy is lost upon each injection, each acceleration and each deceleration of the beam, so the increase in the beam current is limited to a certain maximum value which is determined by the loss rate of energy. Evidently, the lesser the energy loss rate, the greater amount of beam current can be accumulated.

In the synchrotron, part of the beam may be lost during accelerations, so in order to minimize the rate of energy loss, it is preferred that accelerations and decelerations be repeatedly effected at the lowest possible energy. FIG. 3 shows such an example. In this Figure, a higher energy level is set to 100 Mev though it should be determined taking account of an irradiation loss. In this example, a beam having an initial or injection energy level of about 20 MeV is accelerated to about 100 MeV, then decelerated to the initial or injection energy level, whereupon a new beam is injected. Such an operating pattern is repeated as necessary so that after the beam current has been sufficiently increased, the beam is further accelerated to a predetermined energy rating (e.g., about 1 GeV) and then the beam position is detected. The reason why the beam position is not detected in the pattern of increasing the beam energy to 100 MeV and then decreasing to the injection energy level is that the beam position in that acceleration/deceleration pattern is generally different from that which is detected in the pattern of accelerating a beam to the rating energy and decelerating it to the injection energy level.

EMBODIMENT 4

Figure 4:
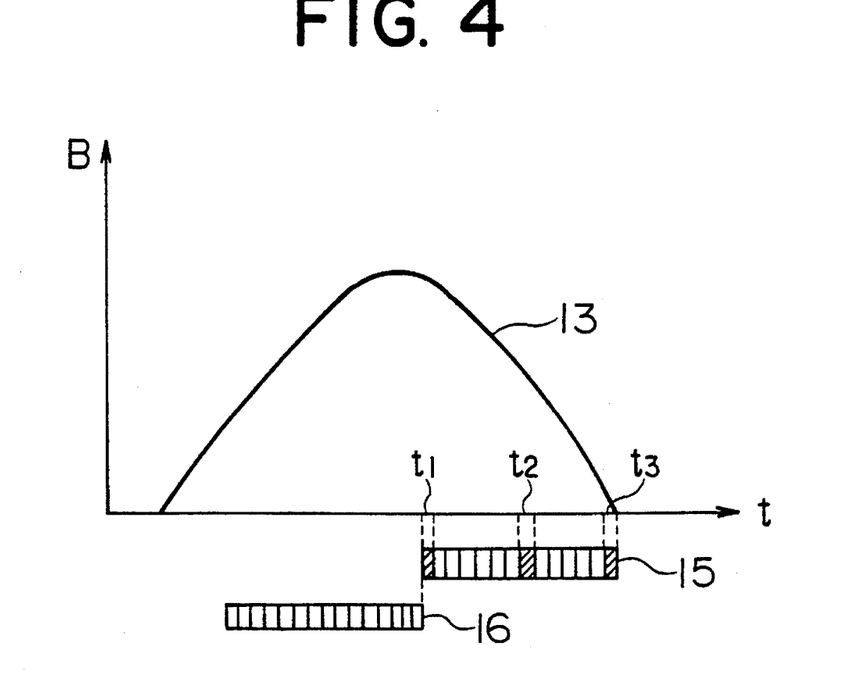
FIG. 4 is an explanatory view showing the waveform of an electromagnetic field pulse generated by a perturbator and beam injection timings according to the invention.
Figure 5:
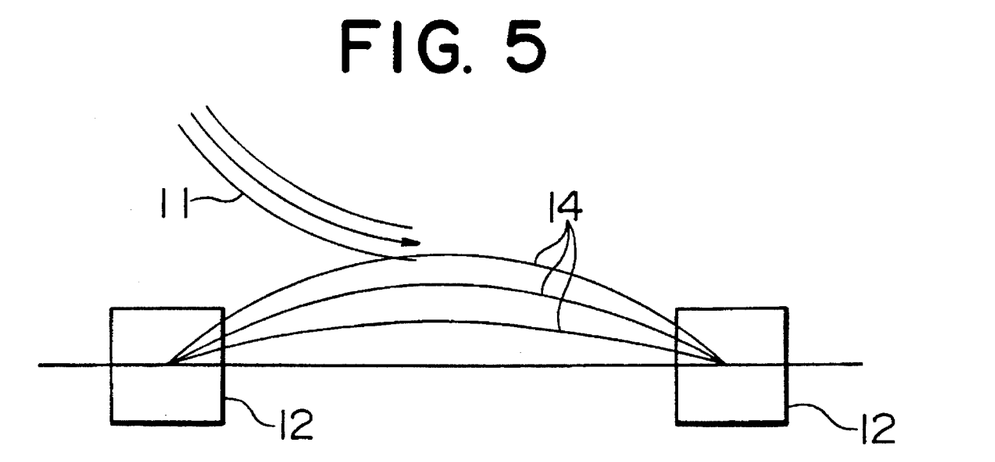
FIG. 5 shows the orbit of a beam changing in a various manner between a pair of perturbators.

A fourth embodiment of the invention will be described below. In general, as illustrated in FIG. 13, a beam is injected into a beam accelerating ring or duct through an inflector 11. To this end, it is necessary to displace the beam orbit to an injection point or inlet of the inflector 11, and then return it to the original location after completion of the beam injection. Injection pulse generators or perturbators 12 in the form of electromagnets are disposed at the opposite sides of the inflectors 11 and energized only at the time of beam injection to generate a magnetic field pulse having a waveform as shown in FIG. 4, for instance. The number of perturbators 12 are generally two or three and they serve to only change the beam orbit between the perturbators 12 including the inflector 11. FIG. 5 shows the beam orbit 14 changing in a various manner between the perturbators 12.

Figure 6:
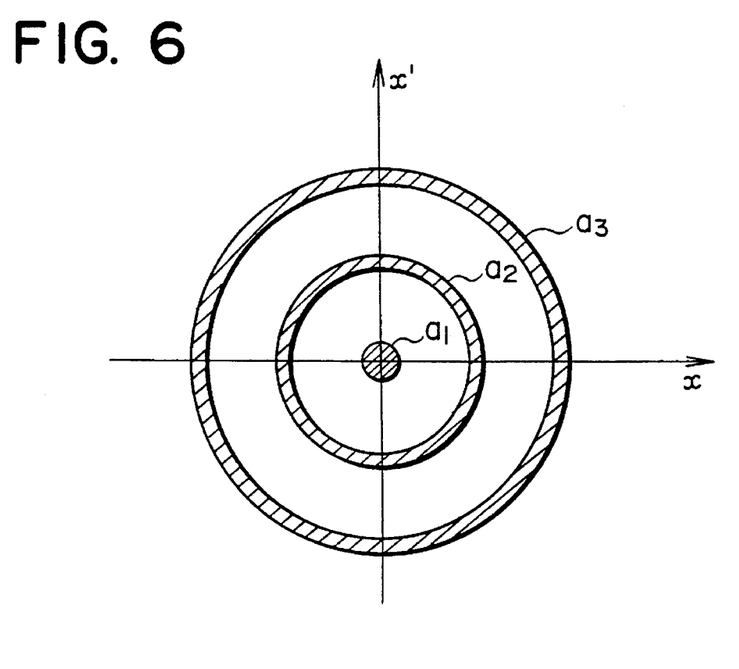
FIG. 6 shows an acceptance area in which a beam can exist.

In this type of beam injection method, multiple beam injections are performed to fill the vacuum chamber with a plurality of beams. The beam diameter immediately after the beam injection is very large. FIG. 6 shows an area in the vacuum chamber in which beams can exist, the area being hereinafter called "acceptance". Since the movement of each electron in a beam has an angle of inclination relative to the direction of transmission or movement of the beam, the acceptance is generally not in a two-dimensional plane (i.e., not in a horizontal or vertical plane), but it is represented in a phase plane in which the ordinate indicates an angle of inclination and the abscissa the beam size. Accordingly, there are two kinds of acceptances, of which one is taken in a horizontal plane, and the other in a vertical place. In FIG. 6, an acceptance in the horizontal or x-axis direction alone is shown which is a circular area defined by an outer peripheral line or circle of an outermost annular area designated at a3. In case of injecting a beam, the injection beam does not fluctuate in a vertical direction, so only a horizontal acceptance should be considered.

When a beam is injected into the accelerating ring at a time during an injection timing duration 15 as shown in FIG. 4, the above-mentioned circular acceptance as illustrated in FIG. 6 is initially filled with the beam. The injected beam is then successively accelerated by high-frequency electromagnetic fields in the accelerating ring, as illustrated in FIG. 13. As the beam energy increases, the beam size or diameter decreases.

In order to accelerate the thus injected beam in an optimal manner, it is necessary detect the accurate position of the orbiting beam. To this end, a plurality of beam position monitors 2 are disposed along the accelerating ring, as illustrated in FIG. 13. However, for the reasons set forth above, the beam position monitors 2 can not detect or measure the exact position of the beam having a large size or cross sectional area. Thus, it is impossible to detect or measure the exact orbit of a beam immediately after the beam has been injected.

Figure 7:
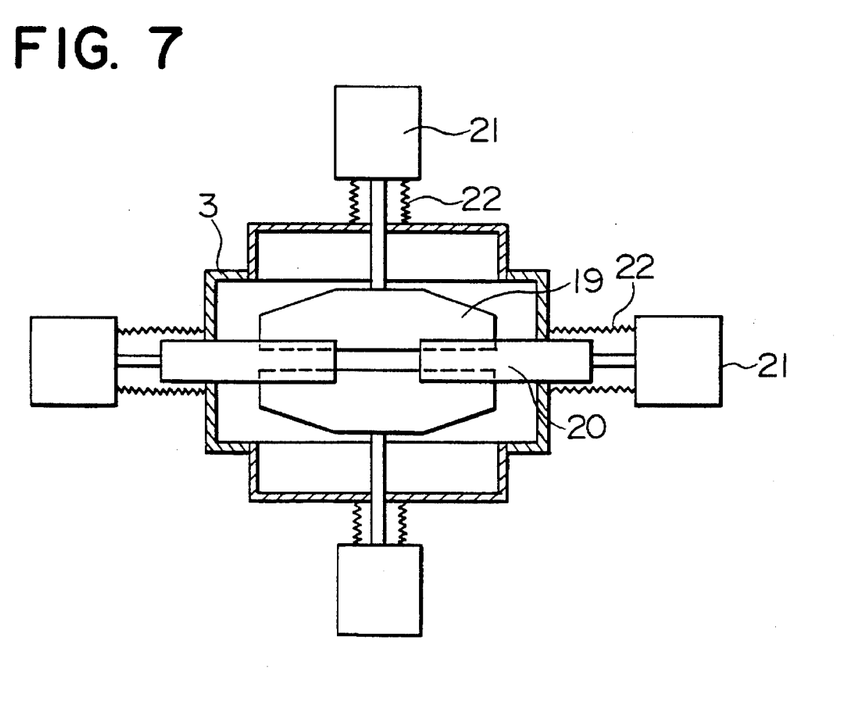
FIG. 7 is a cross section of a beam scraper according to the invention.

In order to cope with this problem, the beam is scraped to a lesser size by a beam scraper, and the position of the thus reduced beam is then measured. FIG. 7 shows a cress section of such a beam scraper, the position of the beam scraper in the accelerating ring being designated at reference numeral 18 in FIG. 13. In FIG. 7, a pair of first or vertical shield plates 19 in the form of metal plates and another pair of second or horizontal shield plates 20 in the form of metal plates are disposed in a vacuum chamber 3 in opposed relation so that they are caused by drive means 21 in the form of motors, respectively, to move toward or away from each other. The pair of second shield plates 20 are disposed in a perpendicular relation with respect to the pair of first shield plates 19. Bellows 22 are connected between the corresponding drive means 21 and the vacuum chamber 3 so as to enclose the corresponding drive rods of the drive means 21 for maintaining vacuum in the vacuum chamber 3 and preventing the entrance of air thereinto. The intended purpose of the beam scraper is to scrape the beam to detect the strength and distribution of the beam when the beam is stable in a high energy state. To achieve this purpose, the beam scraper can be located anywhere in the accelerating ring. In order to detect the position of the beam immediately after the injection thereof, the beam scraper should be disposed other than a location between the adjacent perturbators 12. This is because if the beam scraper is disposed between the perturbators 12, an injection beam can impinge against the shield plates 20 and thus be prevented from proper entrance into the accelerating ring when the direction or point of injection of the injection beam is adjusted or changed by the perturbators 12. In this connection, the shield plates disposed at a location other than the above will not prevent the entrance of a beam or disturb the direction of the entering heal at all when they are moved to adjust the size of The orbiting beam. Thus, the size of the circulating beam can be arbitrarily adjusted by the shield plates without affecting the injection of a beam at all.

Although in the illustrated embodiment of FIG. 7, two pair of shield plates 19, 20 are employed, only one pair of them or only one of them can be used as desired or necessary.

Figure 8:
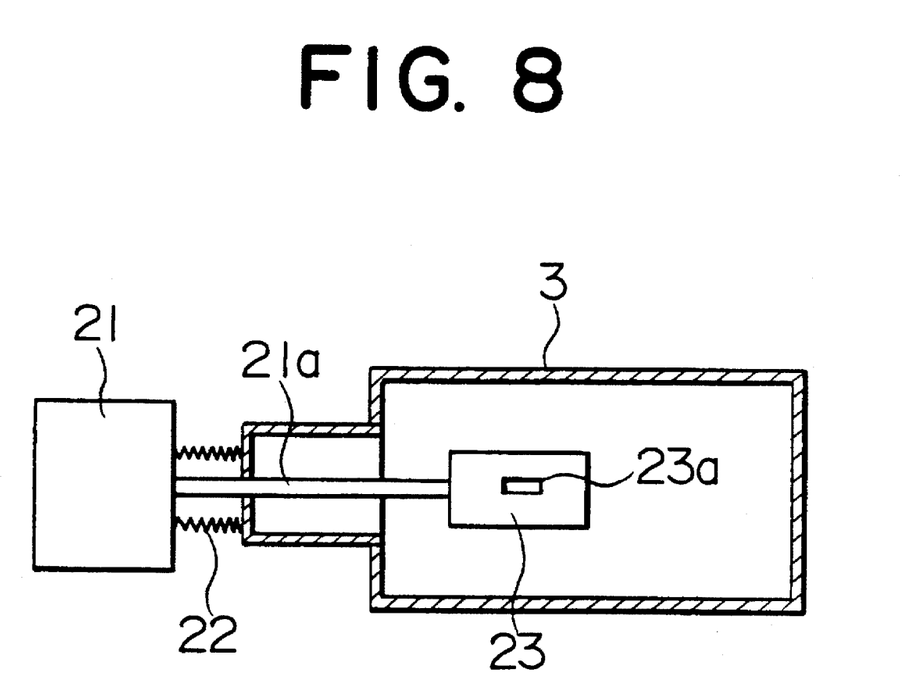
FIG. 8 is a cross section of a slitting device according to the invention.

Moreover, a slitting device as shown in FIG. 8 can be used in place of the beam scraper of FIG. 7 with substantially the same results. In FIG. 8, a shield plate 23 in the form of a metal block having a throughhole or slit 23a formed therein disposed in a vacuum chamber 3 and connected through a drive rod 21a with a drive leans 21 in the form of a motor so that it is driven by the drive means 21 to move between a first or retracted position, in which it is out of the orbit of the beam, and a second or extended position, in which the shield plate 23 is present in the beam orbit, so as to transverse the interior of the vacuum chamber 3 in a direction perpendicular to the orbit of the beam for allowing the passage of a portion of the beam and scraping the cross sectional area or size of the beam into a cross sectional shape of the slit 23a. A beliefs 22 is connected between the drive means 21 and the vacuum chamber 3 for sealing vacuum in the vacuum chamber 3.

Figure 9:
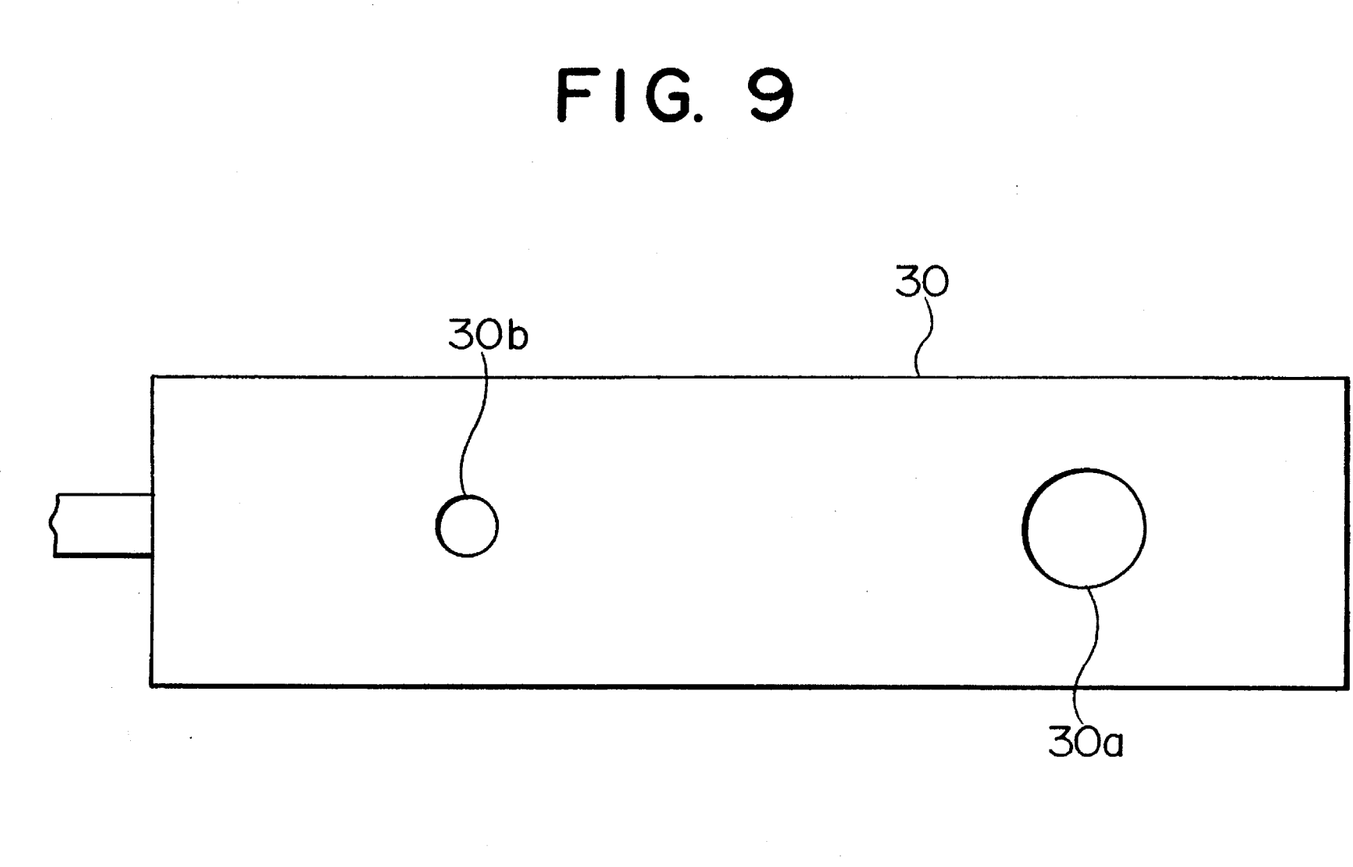
FIG. 9 shows a modified form of shield plate usable with the slitting device of FIG. 8 according to the invention.

FIG. 9 illustrates a modified form of shield plate 30 which can replace the shield plate 23 of FIG. 8, In this modification, the shield plane 30 is formed of a ceramics plate having a fluorescent coating and has a plurality of (e.g., two in the illustrated example) slits or throughholes 30a, 30b formed therein for passage of a beam. The throughholes 30a, 30b are spaced from each other in the direction of movement of the shield plate 30, and they are different in size or cross sectional area from each other. In the illustrated example, the throughhole 30a near a distal end of the plate 80 is greater in size than the throughhole 30b at a basal end thereof. For instance, the diameter of the throughhole 30a is in the range of from about 4 mm to about 5 mm.

Figure 10:
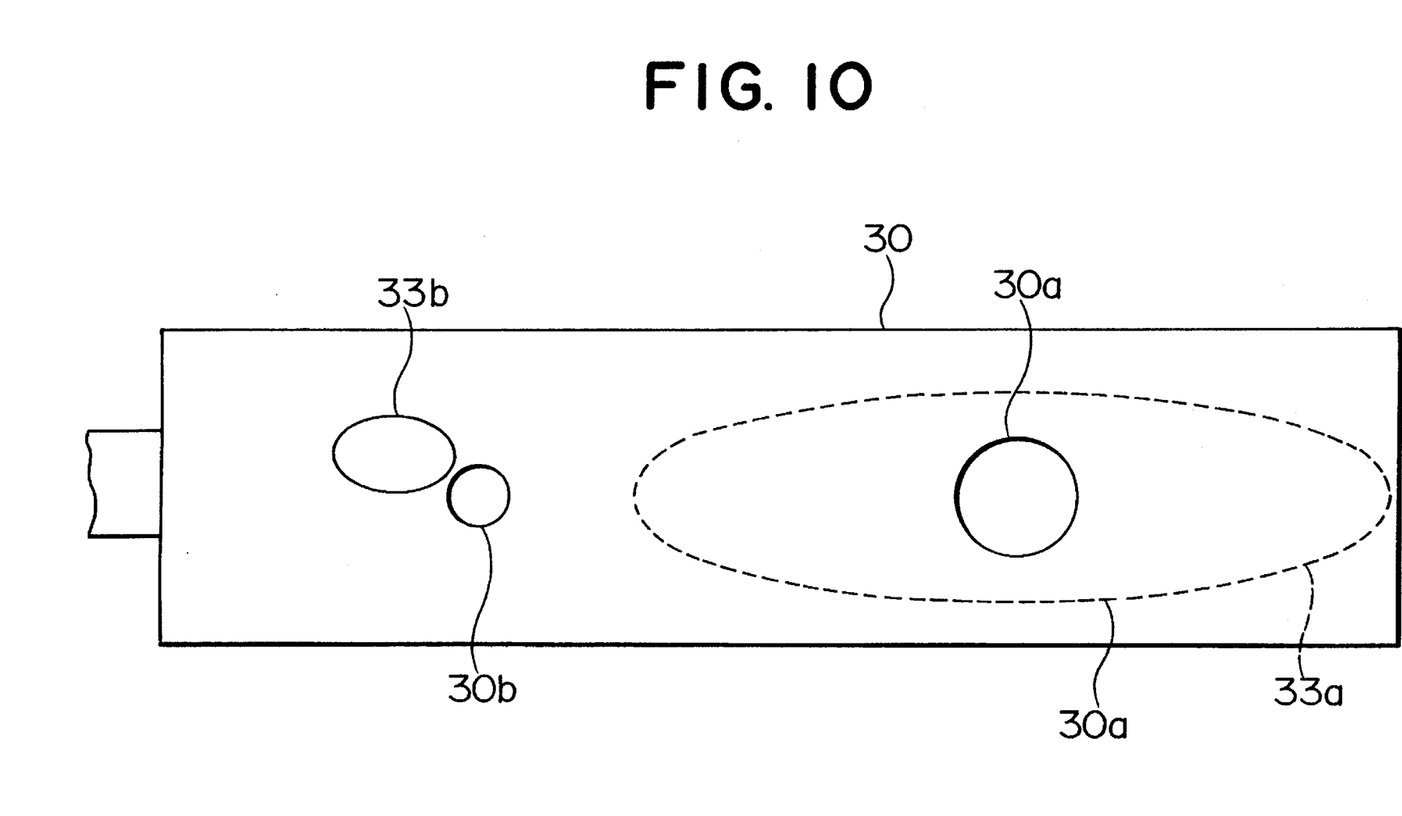
FIG. 10 is a slightly enlarged view of the shield plate of FIG. 9, but showing the operation thereof.

FIG. 10 illustrates the shield plate 30 on a slightly enlarged scale in which a broken-line larger elliptical circle represents a beam 33a striking the plate 30 at a first turn since the injection of the beam, and a solid-line smaller elliptical circle 38b represents the beam at a second turn. In operation, the beam injected from the inflector 11 (see FIG. 18) passes in the accelerating ring or beam duct wish its position and size or diameter being changed through high-frequency magnetic fields generated by unillustrated electromagnets disposed around the beam duct, and it reaches the fluorescent plate 30 which is beforehand moved by the drive means 21 to a location where the beam will pass. The beam strikes the fluorescent plate 30 and generates fluorescent light which can be observed through an unillustrated window in a wall of the vacuum chamber 3 by means of an unillustrated camera. Thus, the cross sectional shape and position of the beam can be detected or measured by the camera. Specifically, watching the fluorescent plate 30 through the camera, an operator can control the motor 21 to adjustably move the plate 30 in a direction transverse to the beam path so the beam 33a at a first turn can pass through the throughhole 30a in the plate 30. In this manner, the beam 33a is scraped by the plate 30 into the same size as the diameter of the throughhole 33a, and a portion thereof thus passing the throughhole 33a moves around the beam duct and again reaches and strikes the plate 30 as a second turn beam 33b, generating fluorescent light at the second time. Thus, the position of the second-turn beam 33b can be observed and hence more information can be obtained by use of a single monitor. In addition, through proper adjustment of the plate 30 by means of the motor 21, the second-turn beam 33b can further pass the smaller throughhole 30b so that a third-turn beam can be observed for further detailed information.

In this connection, the first-turn beam 33 having a diameter of about 30–40 mm is relatively large in its size, and the energy thereof varies from the radially inner side to the radially outer side thereof. Accordingly, by properly adjusting the plate 30, the throughhole 30a can serve to pass a specific portion of the beam 33a having a certain energy band whereby varying beam parameters can be measured instead of using the single throughhole, a plurality of throughholes having different diameters can also serve for the same purpose. In this case, a plurality of beams with varying energy bands can be produced at a time.

Although in the illustrated embodiment, the throughholes 30a, 30b are circular, they can take other configurations such as an ellipse and the like, Furthermore, a plurality of fluorescent plates having a plurality of throughholes disposed at different locations can be used so that some of the plates can be selectively moved into the beam path as necessary.

Figure 11:
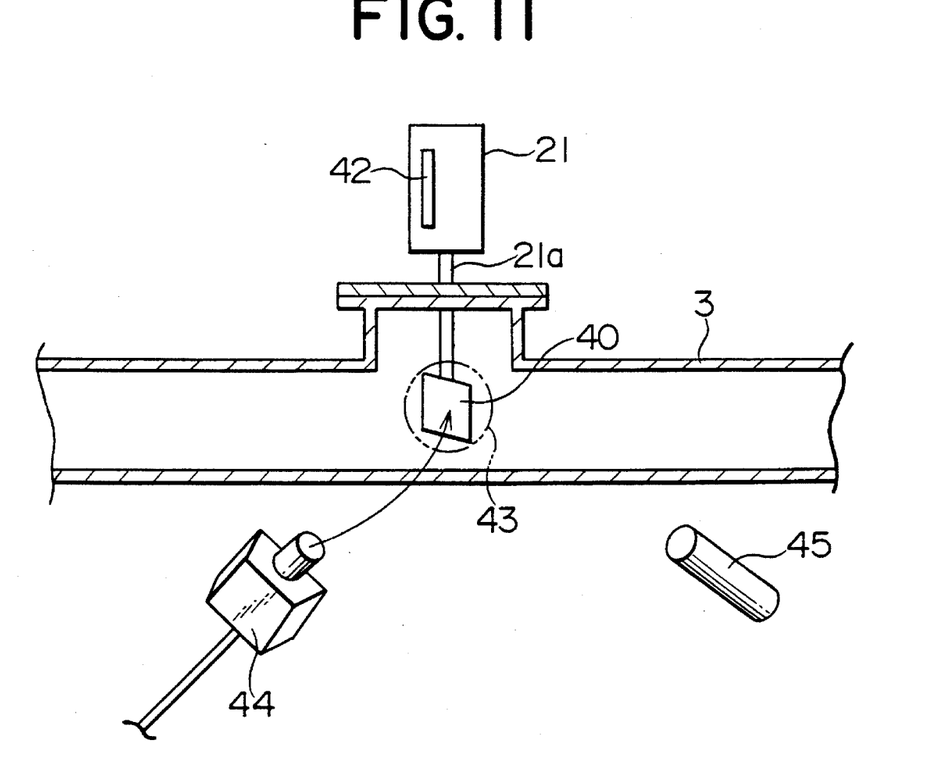
FIG. 11 is a cross section of a modified form of beam scraper according to the invention.
Figure 12:
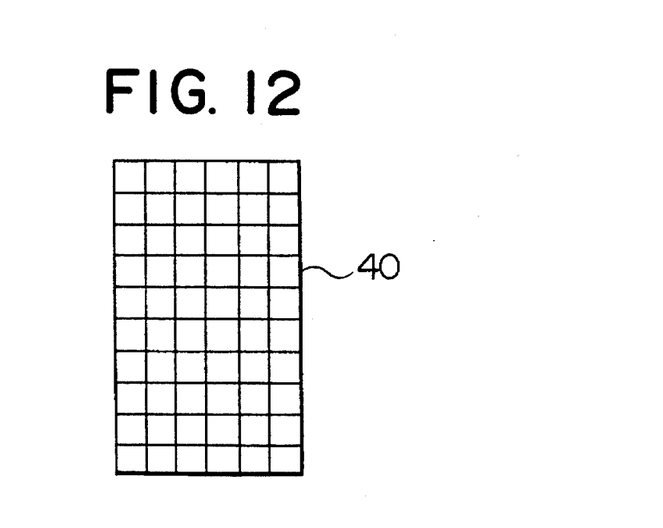
FIG. 12 shows on an enlarged scale a shield plate of the beam scraper of FIG. 11.

FIG. 11 shows a further modified form of beam scraper. This modification is substantially similar to the beam scraper of FIG. 8 except for the following. A shield plate 40 in the vacuum chamber 3 is connected to a distal end of a drive rod 21a of a drive means 21 in the form of a motor. The position of the shield plate 40 in the vacuum chamber 3 is sensed and indicated by a position sensor in the form of a potentiometer 42 mounted on the motor 21. A camera in the form of a television camera 44 is provided outside the vacuum chamber for observing the shield plate 40 through a window 43 in a wall of the vacuum chamber 3. The shield plate 40 is disposed at an angle relative to the orbit or path of a beam so that it can be watched by the television camera 44 which is disposed substantially on a line perpendicular to the beam orbit and passing through the center of the shield plate 40. An X-ray sensor 45 is provided outside the vacuum chamber 3 in the vicinity of the shield plate 40 with its tip end directed to the shield plate 40. The shield plate 40 is formed of a metal such as tantalum with a different kind of metal being deposited on a surface thereof to form a grating or cross stripes, as shown in FIG. 12.

When charged particles in a beam strike the shield plate 40, X rays are generated and sensed by the X-ray sensor 45. The position of the shield plate 40 at that time is detected by the potentiometer 42. An operator can watch the cross sectional shape of the striking beam by means of the television camera 44 through the window 43. Although the shield plate 40 is not perpendicular but oblique so the orbit or the direction of travel of the beam, the exact position of the beam striking the shield plate 40 can be determined based on the beam striking spot on the grated or cross-striped surface of the shield plate 40 and the angle of the plate 40 with respect to the beam orbit.

Instead of employing a metal vapor deposition, crossed marking lines can be provided on a surface of the metal plate 40 to form a grating thereof. The shield plate 40 can be disposed perpendicularly to the beam orbit, and in this case the television camera 44 is disposed at an angle to the surface of the plate 40 so than can observe the plate surface.

EMBODIMENT 5

A fifth embodiment of the invention will be described. Usual multiple beam injections are carried out by use of two or three perturbators 12 (see FIG. 13). Each of the perturbators 12 generates a pulsating magnetic field which pulsates on the order of micro seconds depending upon the size or outer diameter of the accelerating ring of the circular charged particle accelerator so as to temporally move or displace the beam orbit to near the direction or point of Injection of a beam. If otherwise, the orbiting beam necessarily returns to the initial or original position after several revolutions, so it impinges against the walls of the inflector 1 and disappears. Furthermore, if a beam is injected into an area which the pulsating magnetic field rises, the beam will similarly disappear. Therefore, the beam must be injected into an area or timing at which the pulsating magnetic field falls.

As referred to above, FIG. 6 illustrates the horizontal position and the angle of inclination of the orbiting or circulating beam relative to the injection beam on a phase plane. The area in which the circulating and injected beams can coexist is determined depending upon the size of the vacuum chamber 3 as well as the size of a beam passage area in each of other devices disposed in the ring. As described before, in FIG. 6, the outer peripheral circle of the area a3 defines the boundary of such a beam coexisting area.

Specifically, as illustrated in FIG. 4, let us assume that a plurality of beams are injected into the accelerating ting during the injection timing range 15 when a magnetic field having the illustrated waveform is generated by the perturbator 12. In this case, the beam injected at a first timing t1 circulates in the accelerating ring while passing through a first area a1 as shown in FIG. 6. Similarly, the beams injected at an intermediate or second injection timing t2 and at the last or third injection timing t3 circulate in a second and a third area a2, a3. Each beam immediately after its injection does not take an annular distribution as shown in FIG. 6, but it will take a ring-shaped distribution over time. Thus, a beam having a small size can be formed by removing the beams which pass the second and third areas a2, a3 while leaving the beam which passes the first area a1 alone. In this case, the strength of the beam is of course reduced, but the reduced beam can still be detected the beam position monitor 2 in a satisfactory manner.

To this end, the injection timing of a beam with respect to the waveform 13 of an electromagnetic field pulse generated by the perturbators 12 is set to an injection timing range 16 in which the electromagnetic field pulse generated by the perturbators 12 rises, as shown in FIG. 4. In this manner, the beam injected during rising of the magnetic field can not live or exist, leaving only the beam in the first area a1 alive.

EMBODIMENT 6

A sixth embodiment of the invention will be described. The beam size can be reduced by injecting a short beam having a length as short as a full circular length of the accelerating ring into a location near a peak of the pulse-shaped magnetic field waveform. There are a number of methods to shorten the beam length. Among these methods, one example is to reduce a power-supplying time during which power is supplied to a beam generator such as an electron gun, an ion generating source and the like. Another example is to shorten the length of a beam in a beam transmission line by means of a chopper.

What is claimed is:

1. A beam position monitor for measuring position of a beam in an accelerator, said monitor comprising:
   a beam scraper disposed in a beam orbit for scraping a beam circulating in an accelerating ring into a predetermined beam size, said beam scraper comprising
   a plate having a plurality of throughholes formed therein, and
   drive means for moving said plate into and out of a beam passage of said accelerator; and
   said monitor further comprising means for measuring the position of the scraped beam.

2. A beam position monitor according to claim 1, wherein said throughholes are different in their cross sectional area from each other.

3. A beam position monitor according to claim 2, wherein said plate has a fluorescent coating on a surface thereof which generates fluorescent light when the beam strikes said plate.

4. A beam position monitor according to claim 1, wherein said plate has a fluorescent coating on a surface thereof which generates fluorescent light when the beam strikes said plate.

5. A beam position monitor for measuring position of a beam in an accelerator, said monitor comprising:
   a beam scraper disposed in a beam orbit for scraping a beam circulating in an accelerating ring into a predetermined beam size, said beam scraper comprising
   a plate having a checkered marking formed on a surface thereof and being disposed in a duct of said accelerating ring through which charged particles of the beam pass, and
   drive means for moving said plate into and out of the beam passage in said duct; and
   said monitor further comprising:
   an X-ray sensor disposed outside said accelerating ring for detecting X-rays generated when said charged particles strike said plate:
   an inspection window formed through said duct; and
   monitoring means for monitoring, through said inspection window, charged particles which collide with the surface of said plate for measuring the position of the beam.

6. A beam position monitor for measuring position of a beam in an accelerator, said monitor comprising:
   an inflector for injecting a beam into a beam accelerating ring:
   at least two pulse generator means disposed at opposite sides of said inflector for generating a magnetic field pulse for changing a beam orbit in the accelerator;
   a beam scraper disposed in a position within said beam orbit along said beam accelerating ring on an opposite side of said pulse generator means with respect to said inflector for scraping a beam circulating in said accelerating ring into a predetermined beam size, said beam scraper comprising
   at least one first plate and at least one second plate provided in a duct of said accelerating ring through which charged particles of the beam pass, said second plate being disposed perpendicularly to said first plate; and
   drive means for respectively moving said first and second plates into and out of the beam passage in said duct; and
   said monitor further comprising means for measuring the position of the scraped beam.

\* \* \* \* \*